(12) United States Patent
Gripp et al.

(10) Patent No.: US 7,149,425 B2
(45) Date of Patent: Dec. 12, 2006

(54) MONITORING SYSTEM FOR AN OPTICAL TRANSMITTER

(75) Inventors: Jurgen Gripp, Cranford, NJ (US); Oldrich M. Laznicka, Wellesley, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 746 days.

(21) Appl. No.: 10/135,785

(22) Filed: Apr. 30, 2002

(65) Prior Publication Data

US 2004/0208541 A1 Oct. 21, 2004

(51) Int. Cl.
*H04B 10/08* (2006.01)

(52) U.S. Cl. .......................... 398/34; 398/95

(58) Field of Classification Search .................. 398/12, 398/19, 31–34, 45, 48, 49, 50, 95
See application file for complete search history.

(56) References Cited

U.S. PATENT DOCUMENTS

| | | | | | |
|---|---|---|---|---|---|
| 4,942,568 | A | * | 7/1990 | Khoe et al. .................... 398/95 |
| 5,617,234 | A | * | 4/1997 | Koga et al. .................... 398/14 |
| 5,838,848 | A | * | 11/1998 | Laude .......................... 385/24 |
| 5,864,414 | A | * | 1/1999 | Barnsley et al. .............. 398/71 |
| 5,978,119 | A | * | 11/1999 | Giles et al. .................... 398/95 |
| 6,055,078 | A | * | 4/2000 | Chen et al. .................... 398/79 |
| 6,233,261 | B1 | * | 5/2001 | Mesh et al. ............ 372/29.012 |
| 6,643,424 | B1 | * | 11/2003 | Jacobowitz et al. .......... 385/16 |

* cited by examiner

*Primary Examiner*—Christina Y Leung

(57) ABSTRACT

Certain embodiments of the present invention provide a monitoring system configured to monitor output wavelengths, power, and channel switching of tunable lasers employed in an optical transmitter and provide feedback to those lasers, e.g., to lock on the wavelengths corresponding to optical channels in the transmitter. The monitoring system has a monitoring switch fabric, such as an optical waveguide grating (AWG), and one or more photodetector arrays coupled to the transmitter. Optical channels in the monitoring AWG may be offset relative to the optical channels in the transmitter and shaped to allow more sensitive monitoring of, e.g., wavelength drifting of the tunable lasers. The monitoring system may track the lasers in a non-disruptive continuous manner while data is transmitted through the transmitter.

27 Claims, 6 Drawing Sheets

MONITORING SYSTEM FOR AN OPTICAL TRANSMITTER

BACKGROUND OF THE INVENTION

1. Field of the Invention

The present invention relates to optical communication equipment.

2. Description of the Related Art

Tunable lasers are used to generate optical carrier signals that can be modulated with data for transmission over fiber-optic networks. Optical components in such networks (e.g., optical switches) may include numerous tunable lasers. As a result of aging, output characteristics in a laser, such as an output wavelength at selected hardware settings, may change (drift) significantly over the laser's lifetime. To compensate for the drift, each laser is typically monitored and calibrated, preferably in a cost effective, non-disruptive, and dependable manner.

FIG. 1 shows a representative system 100 for transmitting data using an optical switch 102. Switch 102 is a 3×3 switch comprising a 3×3 arrayed waveguide grating (AWG) 104, three line cards 106 coupled to input ports of AWG 104, and three receivers 130 coupled to output ports of AWG 104. Each line card 106 comprises a tunable laser 110 and a modulator 120. Laser 110 feeds an optical carrier signal into modulator 120. Modulator 120 modulates the carrier signal with data to produce a data-modulated output signal of the respective line card 106. Each line card 106 can be configured to send its output signal to any chosen receiver 130 by setting the wavelength of laser 110 to the value corresponding to the desired output port of AWG 104.

System 100 further comprises one or more optical wavelength monitors (OWM) 112, typically one OWM 112 per line card 106. Each OWM 112 is configured to receive a small portion of laser output, analyze it, and generate a feedback signal. Using the feedback signal, laser 110 of the respective line card 106 can adjust its output to lock on a desired wavelength.

FIG. 2 illustrates one typical prior art implementation of OWM 112. OWM 112 comprises a plurality of optical wavelength lockers (OWL) 202, analog-to-digital (A/D) converters 204, a processor 206, and digital-to-analog (D/A) converters 208. The number of OWLs 202 in OWM 112 usually corresponds to the number of optical channels in switch 102. Different OWLs 202 are configured to different wavelengths corresponding to the respective optical channels in switch 102. The output of each OWL 202 is converted into a digital signal by A/D converters 204, processed by processor 206, and converted back into analog form by D/A converters 208 to produce a feedback signal applied to the corresponding laser 110.

OWLs are well known in the art and may be, for example, Santec OWL-10 or OWL-20 available from Santec Corporation of Japan. OWLs are fixed wavelength devices with a relatively narrow capture range of, e.g., 0.25 nm. Therefore, to monitor an N×N optical switch having N lasers, each of which can tune to N different wavelengths, one needs a total of $N^2$ OWLs. With large optical switches, e.g., having 100 channels, such a system becomes large and expensive to implement.

SUMMARY OF THE INVENTION

Certain embodiments of the present invention provide a compact monitoring system for an optical system, such as optical switch 102 of FIG. 1. The monitoring system is configured to monitor output wavelengths, power, and channel switching of tunable lasers employed in the switch and provide feedback to said lasers, e.g., to lock on the wavelengths corresponding to optical channels in the switch. The monitoring system has a monitoring switch fabric, e.g., an optical waveguide grating (AWG), and one or more photo-detector arrays coupled to the switch. Optical channels in the monitoring AWG may be offset relative to the optical channels in the switch and shaped to allow more sensitive monitoring of, e.g., wavelength drifting of the tunable lasers. The monitoring system may track the lasers in a non-disruptive continuous manner while data is transmitted through the switch.

According to one embodiment, the present invention is an apparatus for monitoring an optical system configured to route optical signals generated by one or more lasers, the apparatus comprising: (a) a first optical switch fabric (OSF) having input ports and output ports and configured to route optical signals from its input ports to its output ports; and (b) a first photo-sensing device configured to monitor optical signals output from the first OSF, wherein: the optical signals routed by the first OSF are a portion of the optical signals generated by the one or more lasers; and the first OSF is configured to enable determination of wavelengths of the optical signals generated by the one or more lasers based on signals generated by the first photo-sensing device.

According to another embodiment, the present invention is a method for monitoring an optical system configured to route optical signals generated by one or more lasers, the method comprising the steps of: (A) generating signals using a first photo-sensing device configured to monitor optical signals output from a first optical switch fabric (OSF) having input ports and output ports and configured to route optical signals from its input ports to its output ports, wherein the optical signals routed by the first OSF are a portion of the optical signals generated by the one or more lasers; and (B) determining wavelengths of the optical signals generated by the one or more lasers using the signals generated by the first photo-sensing device.

According to yet another embodiment, the present invention is an apparatus, comprising: (a) a data optical switch fabric (OSF) having input ports and output ports and configured to route optical signals generated by one or more lasers from its input ports to its output ports; (b) a monitoring OSF having input ports and output ports and configured to route optical signals from its input ports to its output ports; and (c) a first photo-sensing device configured to monitor optical signals output from the monitoring OSF, wherein: the optical signals routed by the monitoring OSF are a portion of the optical signals generated by the one or more lasers; and the monitoring OSF is configured to enable determination of wavelengths of the optical signals generated by the one or more lasers and routed by the data OSF based on signals generated by the first photo-sensing device.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
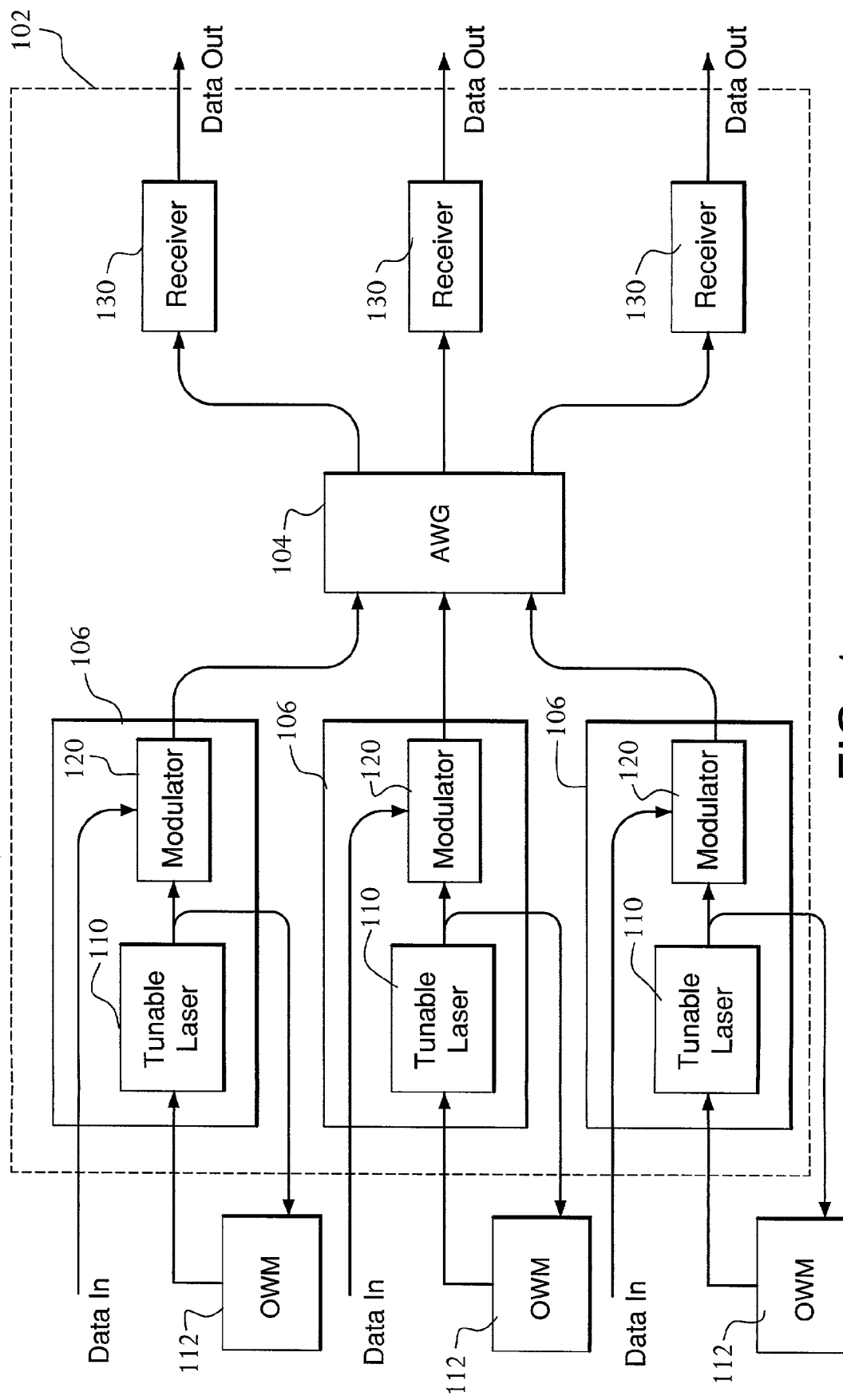
FIG. 1 shows a prior art system for transmitting data using an optical switch.
Figure 2:
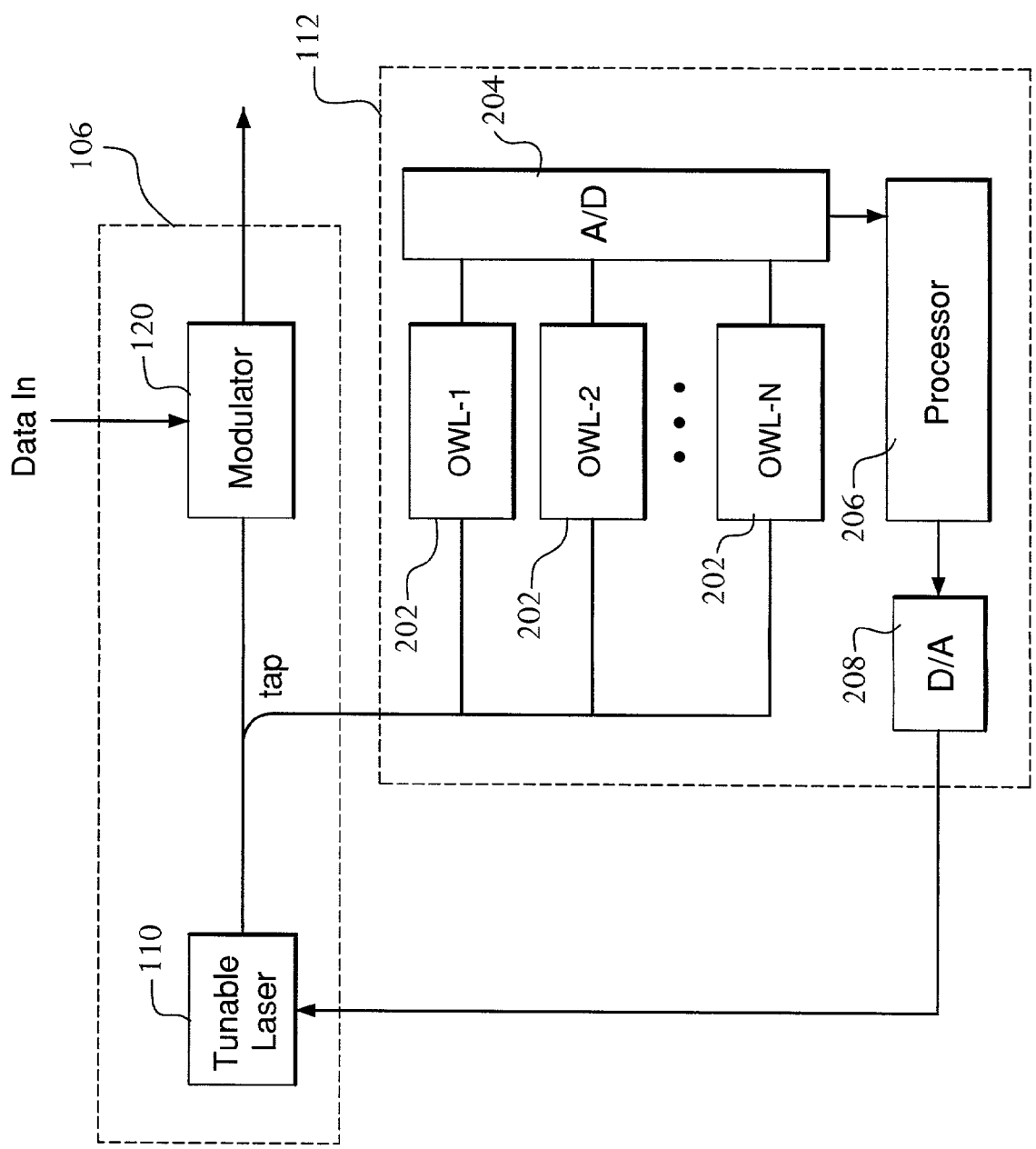
FIG. 2 illustrates a prior art optical wavelength monitor that can be used in the system of FIG. 1.
Figure 3:
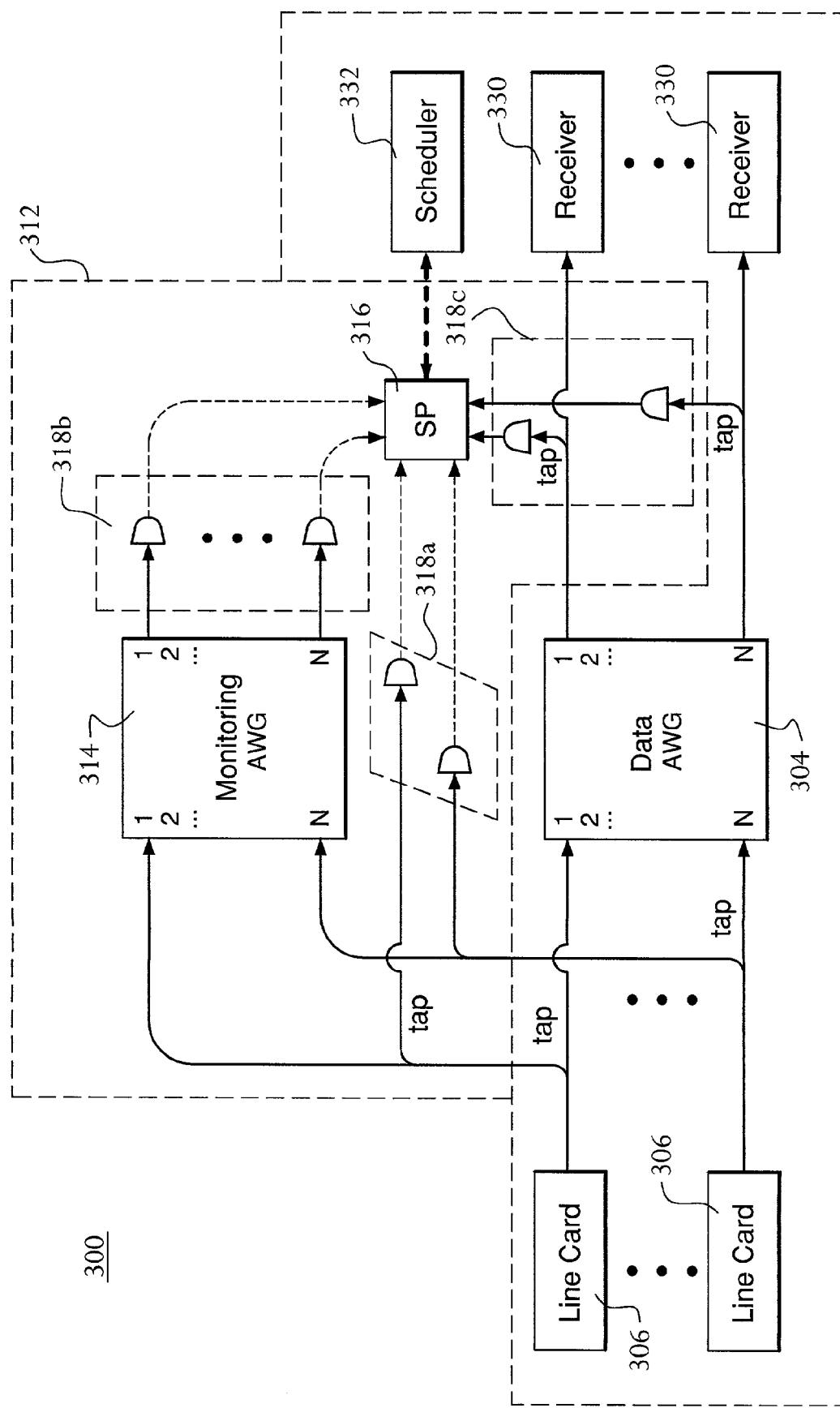
FIG. 3 shows a system for transmitting data and monitoring lasers in line cards according to one embodiment of the present invention.

FIG. 3 shows a system 300 for transmitting data and monitoring lasers in line cards according to one embodiment of the present invention. System 300 comprises an optical switch 302 and a laser monitor 312. Switch 302 is an N×N switch comprising an N×N data AWG 304, N line cards 306 coupled to input ports of data AWG 304, and N receivers 330 coupled to output ports of data AWG 304. In one embodiment, line cards 306 may be similar to line cards 106 of system 100. Line cards 306 are configured to generate data modulated signals using tunable lasers (e.g., similar to lasers 110) and modulators (e.g., similar to modulators 120). Each line card 306 can be configured to send its output signal to any chosen receiver 330 by using an output wavelength ($\lambda_1 \in \{\lambda_1, \ldots, \lambda_N\}$) corresponding to a desired output port of data AWG 304. Switch 302 further comprises a scheduler 332 configured to control output wavelengths of line cards 306 to manage data traffic through data AWG 304, e.g., to avoid instances of two different line cards simultaneously sending data to the same receiver 330. Scheduler 332 may be configured to communicate with line cards 306 through data AWG 304 or through a separate control bus (not shown).

Monitor 312 comprises an N×N monitoring AWG 314, a signal processor 316, and one or more photodetector arrays 318. In one embodiment, monitor 312 may have three arrays 318A–C configured to monitor optical signals in system 300 as shown in FIG. 3. More specifically, array 318A measures optical power of optical signals output from line cards 306; array 318B measures optical power of optical signals after monitoring AWG 314; and array 318C measures optical power of optical signals after data AWG 304. In different embodiments, monitor 312 may have a different number of differently configured arrays 318. In addition, different photo-sensing devices may be used in place of arrays 318.

Outputs of photodetectors in arrays 318A–C are connected to processor 316. Processor 316 is configured to analyze said outputs and generate feedback signals (not shown in FIG. 3) to line cards 306, e.g., using scheduler 332. Based on said feedback signals, line cards 306 may adjust their output wavelengths corresponding to individual optical channels in switch 302, e.g., to compensate for possible wavelength drifting.

In one embodiment, arrays 318A–C comprise linear photodetectors, each of which generates a photocurrent (I) proportional to the power (P) of light impinging on that photodetector according to the following equation:

$$P_k = c_k I_k \qquad (1)$$

where index k represents the k-th photodetector in the array and $c_k$ is a proportionality constant. In different embodiments, non-linear detectors may be used.

Each input port of monitoring AWG 314 is configured to receive a small portion of the optical output from the corresponding line card 306 using an optical tap. Light tapped to the i-th input port of monitoring AWG 314 from the corresponding line card 306 is monitored by the i-th detector in array 318A. Monitoring AWG 314 routes the light received from each line card to array 318B, which is coupled to the output ports of monitoring AWG 314. In general, each photodetector in array 318B receives a portion of that light. However for most photodetectors, that portion is very small. For a given signal input at a particular input port of monitoring AWG 314, only several (e.g., two or three) photodetectors in array 318B connected to the output ports of monitoring AWG 314 with the pass bands approximately matching the wavelength of light might receive a measurable portion of that light.

When only one line card is transmitting, the photocurrent ($I_j$) generated by the j-th detector in array 318B depends on (A) the wavelength ($\lambda_i$) and power ($P_i$) of light generated by the i-th line card 306 and (B) the passband function ($g_{ij}$) characterizing the throughput from the i-th input port to the j-th output port in monitoring AWG 314. Said dependence may be expressed by Equation (2) as follows:

$$I_j = g_{ij}(P_i, \lambda_1) \qquad (2)$$

In one embodiment, passbands of monitoring AWG 314 may be Gaussian-shaped. In other embodiments, differently shaped passbands may be used. For linear photodetectors in arrays 318 and Gaussian-shaped passbands, Equation (2) may be expressed as follows:

$$I_j = d_{ij} c_i I_i \exp\left(-\frac{(\lambda_i - \Lambda_{ij})^2}{2\Delta_{ij}^2}\right) \qquad (3)$$

where $\Lambda_{ij}$ is the center wavelength of the passband corresponding to the i-th input and j-th output ports of monitoring AWG 314; $\Delta_{ij}$ is the width (equal to approximately 42.5% of the full-width at half-maximum) of that passband; $d_{ij}$ is the combined on-resonance loss coefficient; and $I_i$ and $c_i$ are the photocurrent and proportionality constant, respectively, of the i-th photodetector in array 318A.

As already mentioned, only several photodetectors in array 318B will typically produce measurable photocurrents corresponding to the output of an i-th line card. In one embodiment of the present invention, the wavelength of that output may be determined using the output channel (designated herein as jmax-th channel) of monitoring AWG 314 corresponding to the largest photocurrent ($I_{jmax}$) in the measurable photocurrents. The wavelength is determined using Equation (4) as follows:

$$\lambda_i = \Lambda_{ij\max} \pm \Delta_{ij\max} \sqrt{2\ln\left(\frac{d_{ij\max} c_i I_i}{I_{j\max}}\right)} \qquad (4)$$

The "±" ambiguity in Equation (4) represents the fact that the same value of photocurrent, $I_{jmax}$, may be produced with $\lambda_i$ being either on the left or right shoulder of the corresponding passband.

In one embodiment, the correct sign in Equation (4) is determined using the second largest photocurrent in the measurable photocurrents. For example, if the second largest photocurrent is detected at the (jmax−1)-th output port, then the minus sign is selected. Likewise, if the second largest photocurrent is detected at the (jmax+1)-th output port, then the plus sign is selected. In another embodiment, the correct sign in Equation (4) is determined using wavelength dithering. For example, the i-th line card may be configured to change its output wavelength by a small amount around $\lambda_i$ while $I_{jmax}$ is monitored. If an increase in wavelength corresponds to an increase in $I_{jmax}$ then the minus sign is selected. Similarly, if an increase in wavelength corresponds to a decrease in $I_{jmax}$, then the plus sign is selected.

In one embodiment of the present invention, line cards 306 may employ relatively stable lasers whose output power is stabilized around predetermined values (i.e., $P_{i0}$ for the i-th line card) within a relatively narrow range (e.g., ±1%) regardless of the output wavelength. In that case, photodetectors 318A may be optionally removed from system 300. Consequently, the wavelength is determined using a modified Equation (4), wherein the term $c_i I_i$ is replaced with $P_{i0}$.

Figure 4:
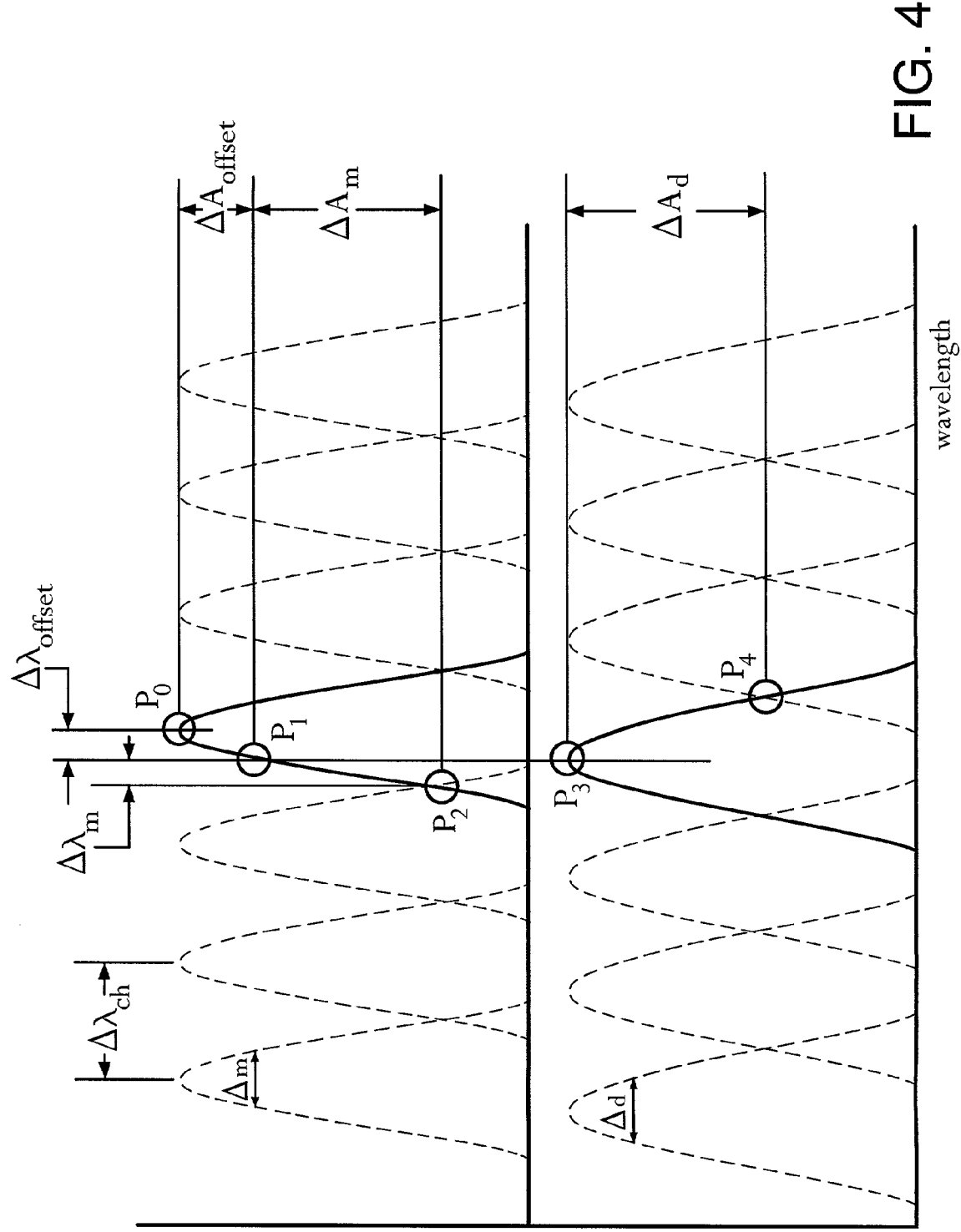
FIG. 4 illustrates how the passbands in the monitoring AWG used in the system of FIG. 3 may be configured according to one embodiment of the present invention.

FIG. 4 illustrates how the passbands in monitoring AWG 314 may be configured according to one embodiment of the present invention. The top and bottom panels in FIG. 4 show transmission curves corresponding to different channels of AWGs 314 and 304, respectively. Channel spacing ($\Delta\lambda_{ch}$) is chosen to be approximately the same for both AWGs. However, the passbands in monitoring AWG 314 are shifted by $\Delta\lambda_{offset}$ relative to those in data AWG 304. Passband widths ($\Delta_{ij}$) for different channels in monitoring AWG 314 and data AWG 304 are uniform and equal to $\Delta_m$ and $\Delta_d$, respectively, where $\Delta_m$ may or may not equal $\Delta_d$.

As can be seen in FIG. 4, $\Delta\lambda_{offset}$ causes a resonance wavelength in data AWG 304 (point $P_3$ in FIG. 4) to be located on a shoulder of the respective passband in monitoring AWG 314. Due to this feature, relatively small changes in laser wavelength around $P_3$ are converted to relatively large changes in the photocurrent generated by the corresponding photodetector in array 318B. In a preferred implementation, $P_3$ corresponds to a point of the steepest slope (e.g., point $P_1$ in FIG. 4) on the respective passband of monitoring AWG 314. For Gaussian-shaped passbands, $\Delta\lambda_{offset}$ may be selected using Equation (5) as follows:

$$\Delta\lambda_{offset} = \Delta_m = \frac{FWHM_m}{2\sqrt{2\ln 2}} \approx 0.425 FWHM_m \tag{5}$$

where $FWHM_m$ is the full-width at half-maximum for a passband in monitoring AWG 314. The amplitude ratio ($\Delta A_{offset}$) between the passband peak (point $P_0$ in FIG. 4) and point $P_1$ is given by Equation (6):

$$\Delta A_{offset} = \sqrt{e} = 2.17 \text{ dB} \tag{6}$$

In one embodiment of the present invention, a suitable value for $FWHM_m$ may be selected based on the following considerations. On one hand, it is desirable to have narrow passbands so that relatively small laser wavelength variations result in relatively large photocurrent variations. On the other hand, it is desirable for monitor 312 to detect any laser wavelength within the wavelength range of monitoring AWG 314, which favors relatively wide, overlapping passbands. For example, at the point of lowest transmission (e.g., point $P_2$ in FIG. 4) between two passbands, there should be enough transmission to ensure reliable detection. The following choice of $FWHM_m$ may balance these two conflicting requirements:

$$FWHM_m \approx \Delta\lambda_{ch}\sqrt{\frac{\ln 2}{\ln R_{dyn} - \ln \Delta P}} \tag{7}$$

where $R_{dyn}$ is the dynamic range of photodetectors in array 318B and $\Delta P$ is the power variation at photodetectors in array 318B due to (i) variation in transmission losses corresponding to different combinations of input and output ports of monitoring AWG 314 and (ii) variation in the output power of different line cards 306. $\Delta P$ may be calculated, e.g., using the following expression:

$$\Delta P = \max_{i,j}(d_{ij}c_i I_i) / \min_{i,j}(d_{ij}c_i I_i)$$

Using the example illustrated by FIG. 4, $R_{dyn}$ may be selected as follows:

$$R_{dyn} \geq \Delta A_m \Delta A_{offset} \Delta P \tag{8}$$

where $\Delta A_m$ is the difference in transmission between points $P_1$ and $P_2$ in a passband of monitoring AWG 314.

Figure 5:
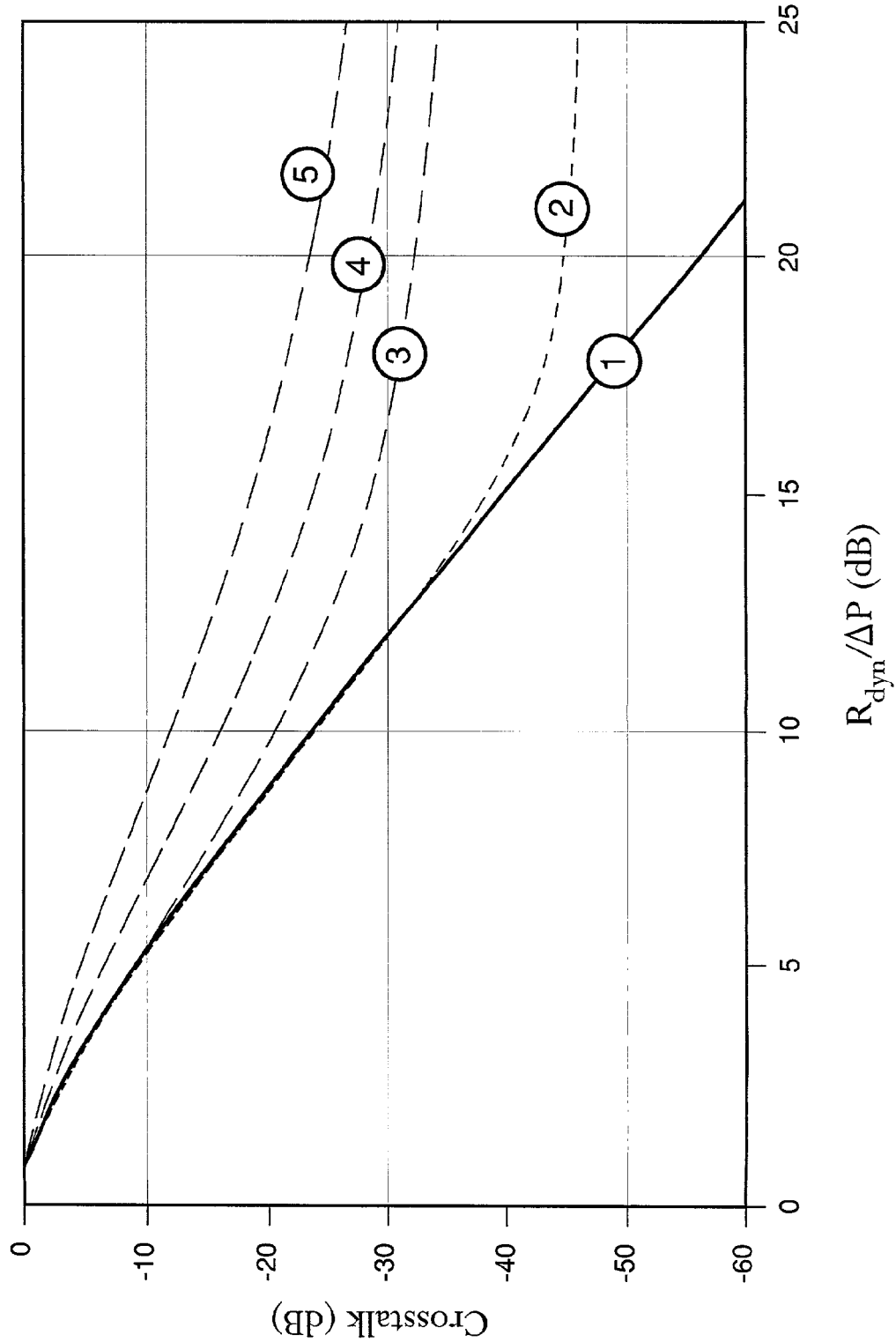
FIG. 5 illustrates the amount of crosstalk between different channels of the monitoring AWG used in the system of FIG. 3 in one embodiment of the present invention.

FIG. 5 illustrates the amount of crosstalk between different channels of monitoring AWG 314 as a function of various parameters of system 300 in one embodiment of the present invention. More specifically, for Gaussian-shaped passbands, the amount of crosstalk ($C_x$) between the j-th and (j−1)-th output ports of monitoring AWG 314 can be expressed as follows:

$$C_x = \exp\left(-\frac{1}{2}\left((1-p)\frac{\Delta\lambda_{ch}}{\Delta_m} - 1\right)^2\right) \tag{9}$$

where p is a shift factor defined by the following equation:

$$p = \frac{\Lambda_{ij} - \Delta\lambda_{offset} - \lambda_i}{\Delta\lambda_{ch}} \tag{10}$$

Combining Equations (7) and (9), one can obtain the following expression for the crosstalk:

$$C_x \approx \exp\left(-\frac{1}{2}\left((1-p)\sqrt{8\left(\ln\frac{R_{dyn}}{\Delta P}\right)} - 1\right)^2\right) \tag{11}$$

FIG. 5 illustrates Equation (11) for three representative shift factors (i.e., p=0.0; 0.1; and 0.2). More specifically, line 1 corresponds to an ideal unmodulated laser source and p=0.0; line 2 corresponds to a finite line-width unmodulated laser source and p=0.0; line 3 corresponds to a finite line-width modulated laser source and p=0.0; line 4 corresponds to a finite line-width modulated laser source and p=0.1; and line 5 corresponds to a finite line-width modulated laser source and p=0.2.

Using the analysis presented above, one can design monitor 312 for system 300 to correspond to selected (e.g., customer) specifications. For example, the following table gives a representative set of parameters that may be used in one implementation of system 300.

| # | Parameter | Value |
|---|-----------|-------|
| 1 | Bit Rate (Gb/s) | 40 |
| 2 | Channel Spacing $\Delta\lambda_{ch}$ (GHz) | 100 |
| 3 | Crosstalk $C_x$ (dB) | $\leq -30$ |
| 4 | Power variation $\Delta P$ (dB) | $\leq 3$ |
| 5 | Dynamic Range $R_{dyn}$ (dB) | $\geq 23$ |
| 6 | $FWHM_m$ (GHz) | 40 |
| 7 | $\Delta\lambda_{offset}$ (GHz) | 17 |

Lines 1–4 in the table show representative specifications for switch 302 of system 300. Lines 5–7 in the table show representative parameters for monitor 312 of system 300 derived based on the specifications in lines 1–4 and Equations (5), (7), (8), and (11). Depending on the particular implementation and system requirements, parameters different from those given in the table may be used in different embodiments of system 300.

Figure 6:
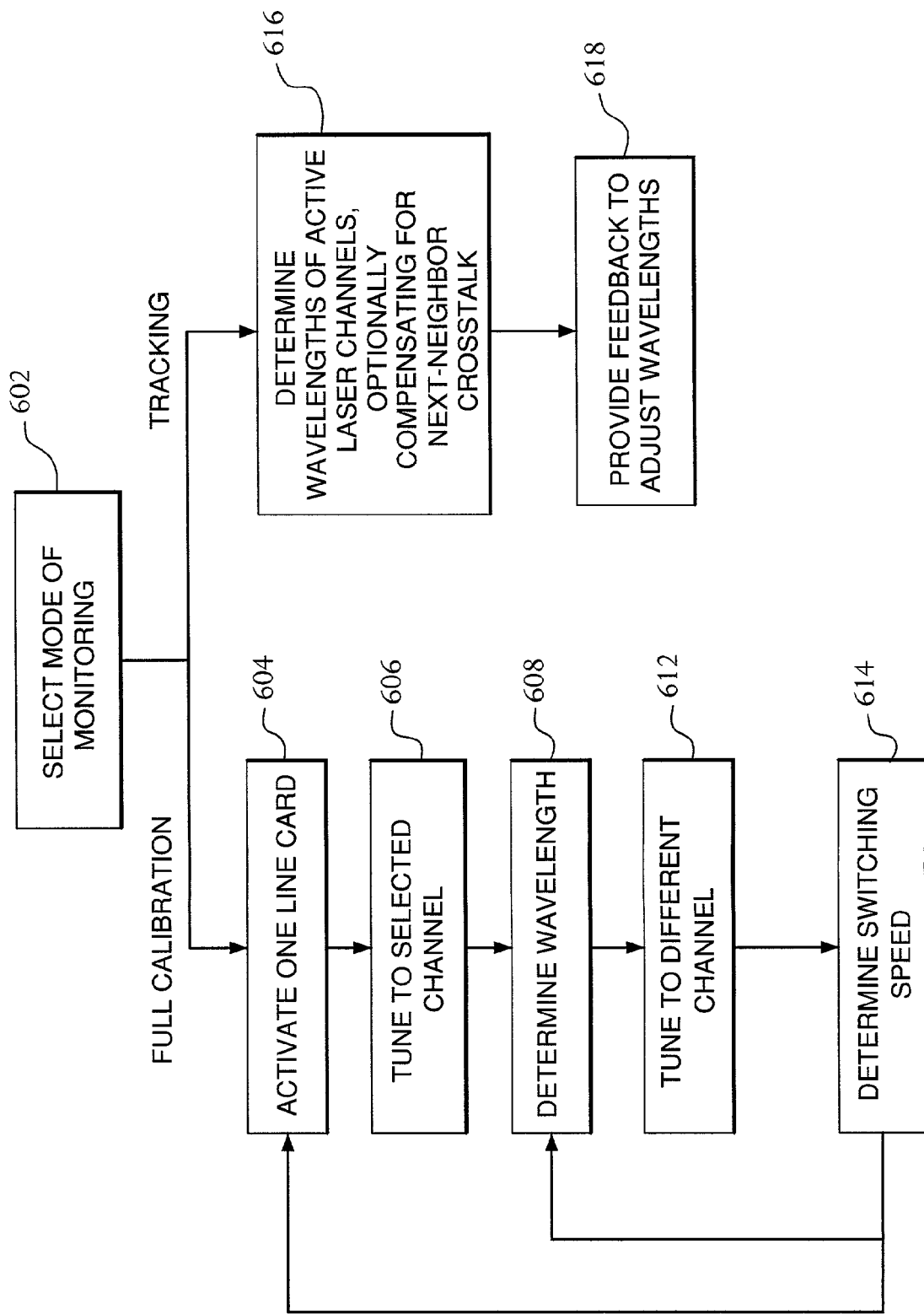
FIG. 6 shows a method of monitoring that may be used in the system of FIG. 3 according to one embodiment of the present invention.

FIG. 6 shows a method 600 of monitoring switch 302 using monitor 312 according to one embodiment of the present invention. In step 602 of method 600, a mode of monitoring is selected, e.g., using signal processor 316 and scheduler 332. Two exemplary modes of monitoring, e.g., full calibration mode and tracking mode, are illustrated in FIG. 6. The full calibration mode is a service mode, during which transmission of data through switch 302 is interrupted, whereas the tracking mode is a non-disruptive continuous monitoring mode performed in the background while user data is transmitted through switch 302. In different implementations of method 600, additional and/or different modes of monitoring may be utilized.

If the full calibration mode is selected in step 602, then system 300 proceeds to step 604, wherein one selected line card 306 is activated while the remaining line cards are turned off. In step 606, the active line card is tuned to a selected laser channel. In step 608, the wavelength corresponding to that laser channel is measured, e.g., using arrays 318A–B, Equation (4), and at least one of the above-described procedures for determining the correct sign in that equation. In step 612, the active line card is tuned to a different laser channel. In step 614, the switching speed for switching that line card between those two channels is determined, e.g., by using array 318C and the time required for the signal to appear at the output port of data AWG 304 corresponding to the new channel. Steps 608–614 may be repeated until all laser channels of the selected line card 306 are characterized. After that, a similar procedure (e.g., steps 604 through 614) may be performed for a different line card.

In situations where lasers in line cards 306 are relatively stable (e.g., undergo small wavelength drifting relatively far from a mode hop), the tracking mode may be selected in step 602. Switch 302 is usually operated using scheduler 332 so that only one line card 306 sends data to a specific receiver 330. Therefore, up to N different laser channels corresponding to N different line cards may be active simultaneously. Those channels may be monitored without disrupting the operation of switch 302. The wavelengths of all lasers can be computed from the sets of photocurrents, taking next-neighbor crosstalk into account.

For example, in step 616, the wavelengths of the currently active laser channels are determined, e.g., using a scheduling table of switch 302, arrays 318A–B, Equation (4), and the correct sign in that equation, e.g., as obtained in the last full calibration. In one implementation of method 600, step 616 may include the following representative steps:

Step 616A: determining the wavelength of the channel that suffers the least amount of crosstalk (one possible choice of such channel may be the rightmost channel in FIG. 4);

Step 616B: estimating the amount of crosstalk that the measured channel induces in the nearest neighbor(s);

Step 616C: determining the wavelength(s) of the nearest neighbor channel(s) while subtracting the crosstalk estimated in step 616B from the corresponding photocurrents detected by array 318B; and Step 616D: repeating steps 616B–C until all active channels are characterized.

As switch 302 keeps changing corresponding combinations of line cards 306 and receivers 330 during data transmission, potentially all $N^2$ laser channels may eventually be characterized during step 616. Using the results of step 616, feedback signals may be generated and provided to line cards 306 in step 618, e.g., using signal processor 316 and scheduler 332, to compensate for wavelength drifting.

If one of the lasers in line cards 306 approaches or undergoes a mode hop, recalibration of the system may be performed, e.g., using steps 604–614 as described above. After such recalibration, the tracking mode may resume. System recalibrations may be scheduled using a fixed time schedule and/or using laser mode stability data (e.g., the occurrence of mode hops) gathered during the tracking mode.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the claims.

For example, data AWG 304 and monitoring AWG 314 may be implemented using non-uniform passband widths and/or different channel spacing. Furthermore, those AWGs may be implemented on a single wafer or two different wafers. In the latter case, the AWGs may be maintained at different temperatures, e.g., to enable temperature tuning of $\Delta\lambda_{offset}$. Photodetector arrays 318 may be based on any suitable light-sensitive device, such as, for example, a photodiode, a phototransistor, a photogate, photo-conductor, a charge-coupled device, a charge-transfer device, or a charge-injection device. Similarly, as used in this specification, the term "light" refers to any suitable electromagnetic radiation in any wavelength that may be used in an optical transmission system, such as system 300. Although the invention has been described for a system employing AWGs, those skilled in the art can appreciate that the invention can be equally applied to systems employing other types of optical switch fabrics.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. An apparatus for monitoring an optical system configured to route optical signals generated by one or more lasers, the apparatus comprising:
   (a) a first optical switch fabric (OSF) having input ports and output ports and configured to route optical signals from its input ports to its output ports; and
   (b) a first photo-sensing device configured to monitor optical signals output from the first OSF, wherein:
   for each wavelength generated by the one or more lasers, the first OSF is adapted to route a portion of the respective optical signal;
   the first OSF is configured to enable determination of wavelengths of the optical signals generated by the one or more lasers based on signals generated by the first photo-sensing device; and
   the optical system comprises a second OSF having input ports and output ports and configured to route the optical signals generated by the one or more lasers from its input ports to its output ports based on wavelength, wherein the one or more lasers are configured to transmit at one or more wavelengths corresponding to one or more optical channels of the second OSF based on said determination.

2. The invention of claim 1, further comprising a processor configured to process the signals generated by the first photo-sensing device.

3. The invention of claim 2, wherein the one or more lasers comprise at least one tunable laser and the processor is configured to provide feedback to control operations of said tunable laser.

4. The invention of claim 3, wherein:
   said tunable laser is configured to transmit at a wavelength corresponding to an optical channel of the second OSF based on said feedback.

5. The invention of claim 2, wherein the processor is configured to (i) determine inter-channel crosstalk in the first OSF and (ii) use said crosstalk in the determination of one or more transmission wavelengths for the one or more lasers.

6. The invention of claim 1, further comprising a second photo-sensing device configured to monitor the optical signals generated by the one or more lasers.

7. The invention of claim 6, wherein:
   the one or more lasers comprise at least one tunable laser; and
   the apparatus further comprises a third photo-sensing device coupled to the output ports of the second OSF and configured to monitor switching speed of said tunable laser.

8. The invention of claim 1, wherein:
   the first OSF and the second OSF are arrayed waveguide gratings; and
   the first photo-sensing device is an array of photodetectors, wherein each output port of the first OSF is configured to a different photodetector in the array.

9. The invention of claim 1, wherein:
   passbands of the first OSF are configured differently from passbands of the second OSF.

10. The invention of claim 1, wherein passbands of the first OSF are offset relative to passbands of the second OSF.

11. The invention of claim 10, wherein the first OSF and the second OSF are implemented on different devices and the relative offset of the passbands is tuned by changing temperature of at least one device.

12. The invention of claim 10, wherein the peak of each passband of the second OSF corresponds to a point on the slope of a passband of the first OSF.

13. The invention of claim 10, wherein the shapes of the passbands of the first OSF are different from the shapes of the passbands of the second OSF.

14. The invention of claim 1, wherein the first OSF and the second OSF are connected such that the optical signals routed by the first OSF bypass the second OSF.

15. A method for monitoring an optical system configured to route optical signals generated by one or more lasers, the method comprising the steps of:
   (A) generating signals using a first photo-sensing device configured to monitor optical signals output from a first optical switch fabric (OSF) having input ports and output ports and configured to route optical signals from its input ports to its output ports, wherein for each wavelength generated by the one or more lasers, the first OSF is adapted to route a portion of the respective optical signal; and
   (B) determining wavelengths of the optical signals generated by the one or more lasers using the signals generated by the first photo-sensing device, wherein:
   the first OSF is configured to enable said determination; and
   the optical system comprises a second OSF having input ports and output ports and configured to route the optical signals generated by the one or more lasers from its input ports to its output ports based on wavelength, wherein the one or more lasers are configured to transmit at one or more wavelengths corresponding to one or more optical channels of the second OSF based on said determination.

16. The method of claim 15, wherein the one or more lasers comprise at least one tunable laser and step (B) further comprises the step of providing feedback to control operations of said tunable laser.

17. The method of claim 16, wherein:
   said tunable laser is configured to transmit at a wavelength corresponding to an optical channel of the second OSF based on said feedback.

18. The method of claim 15, wherein step (B) further comprises the steps of:
   (B1) determining wavelength corresponding to a channel that suffers the least amount of crosstalk;
   (B2) calculating amount of crosstalk that the measured channel induces in a neighbor channel;
   (B3) determining wavelength corresponding to the neighbor channel using the calculated amount of crosstalk; and
   (B4) repeating steps (B2)–(B3) until wavelengths corresponding to all active channels are determined.

19. The method of claim 15, wherein:
   the one or more lasers comprise at least one tunable laser; and
   the method further comprises the step of monitoring of switching speed of said tunable laser based on signals generated by a third photo-sensing device coupled to the output ports of the second OSF.

20. The method of claim 15, wherein step (B) comprises the step of determining wavelengths of active lasers while user data is transmitted through the optical system.

21. The method of claim 15, wherein the first OSF and the second OSF are connected such that the optical signals routed by the first OSF bypass the second OSF.

22. An apparatus for monitoring an optical system configured to route optical signals generated by one or more lasers, the apparatus comprising:
(a) a first optical switch fabric (OSF) having input ports and output ports and configured to route optical signals from its input ports to its output ports;
(b) a first photo-sensing device configured to monitor optical signals output from the first OSF, wherein:
the optical signals routed by the first OSF are a portion of the optical signals generated by the one or more lasers; and
the first OSF is configured to enable determination of wavelengths of the optical signals generated by the one or more lasers based on signals generated by the first photo-sensing device; and
(c) a processor configured to process the signals generated by the first photo-sensing device, wherein the processor is configured to (i) determine inter-channel crosstalk in the first OSF and (ii) use said crosstalk in the determination of one or more transmission wavelengths for the one or more lasers.

23. A method for monitoring an optical system configured to route optical signals generated by one or more lasers, the method comprising the steps of:
(A) generating signals using a first photo-sensing device configured to monitor optical signals output from a first optical switch fabric (OSF) having input ports and output ports and configured to route optical signals from its input ports to its output ports, wherein the optical signals routed by the first OSF are a portion of the optical signals generated by the one or more lasers; and
(B) determining wavelengths of the optical signals generated by the one or more lasers using the signals generated by the first photo-sensing device, wherein step (B) further comprises the steps of:
(B1) determining wavelength corresponding to a channel that suffers the least amount of crosstalk;
(B2) calculating amount of crosstalk that the measured channel induces in a neighbor channel; and
(B3) determining wavelength corresponding to the neighbor channel using the calculated amount of crosstalk.

24. The method of claim 23, wherein step (B) further comprises the step of repeating steps (B2)–(B3) until wavelengths corresponding to all active channels are determined.

25. An apparatus for monitoring an optical system configured to route optical signals generated by one or more lasers, the apparatus comprising:
(a) a first optical switch fabric (OSF) having input ports and output ports and configured to route optical signals from its input ports to its output ports;
(b) a first photo-sensing device configured to monitor optical signals output from the first OSF; and
(c) a second photo-sensing device configured to monitor the optical signals generated by the one or more lasers, wherein:
the optical signals routed by the first OSF are a portion of the optical signals generated by the one or more lasers;
the first OSF is configured to enable determination of wavelengths of the optical signals generated by the one or more lasers based on signals generated by the first photo-sensing device;
the optical system comprises a second OSF having input ports and output ports and configured to route the optical signals generated by the one or more lasers from its input ports to its output ports based on wavelength, wherein the one or more lasers are configured to transmit at one or more wavelengths corresponding to one or more optical channels of the second OSF based on said determination;
the one or more lasers comprise at least one tunable laser; and
the apparatus further comprises a third photo-sensing device coupled to the output ports of the second OSF and configured to monitor switching speed of said tunable laser.

26. An apparatus for monitoring an optical system configured to route optical signals generated by one or more lasers, the apparatus comprising:
(a) a first optical switch fabric (OSF) having input ports and output ports and configured to route optical signals from its input ports to its output ports; and
(b) a first photo-sensing device configured to monitor optical signals output from the first OSF, wherein:
the optical signals routed by the first OSF are a portion of the optical signals generated by the one or more lasers;
the first OSF is configured to enable determination of wavelengths of the optical signals generated by the one or more lasers based on signals generated by the first photo-sensing device;
the optical system comprises a second OSF having input ports and output ports and configured to route the optical signals generated by the one or more lasers from its input ports to its output ports based on wavelength, wherein the one or more lasers are configured to transmit at one or more wavelengths corresponding to one or more optical channels of the second OSF based on said determination; and
passbands of the first OSF are offset relative to passbands of the second OSF, wherein the peak of each passband of the second OSF corresponds to a point on the slope of a passband of the first OSF.

27. A method for monitoring an optical system configured to route optical signals generated by one or more lasers, the method comprising the steps of:
(A) generating signals using a first photo-sensing device configured to monitor optical signals output from a first optical switch fabric (OSF) having input ports and output ports and configured to route optical signals from its input ports to its output ports, wherein the optical signals routed by the first OSF are a portion of the optical signals generated by the one or more lasers; and
(B) determining wavelengths of the optical signals generated by the one or more lasers using the signals generated by the first photo-sensing device, wherein:
the first OSF is configured to enable said determination;
the optical system comprises a second OSF having input ports and output ports and configured to route the optical signals generated by the one or more lasers from its input ports to its output ports based on wavelength, wherein the one or more lasers are configured to transmit at one or more wavelengths corresponding to one or more optical channels of the second OSF based on said determination;
the one or more lasers comprise at least one tunable laser; and
the method further comprises the step of monitoring of switching speed of said tunable laser based on signals generated by a third photo-sensing device coupled to the output ports of the second OSF.

* * * * *